(12) United States Patent
Schwab et al.

(10) Patent No.: US 7,958,214 B1
(45) Date of Patent: Jun. 7, 2011

(54) METHOD FOR SECURE TRANSACTIONS UTILIZING PHYSICALLY SEPARATED COMPUTERS

(76) Inventors: Barry H. Schwab, West Bloomfield, MI (US); John G. Posa, Ann Arbor, MI (US)

( * ) Notice: Subject to any disclaimer, the term of this patent is extended or adjusted under 35 U.S.C. 154(b) by 1083 days.

(21) Appl. No.: 09/877,596

(22) Filed: Jun. 8, 2001

Related U.S. Application Data

(60) Provisional application No. 60/210,879, filed on Jun. 9, 2000.

(51) Int. Cl.
*G06F 15/173* (2006.01)
(52) U.S. Cl. .......... 709/223; 709/203; 709/217; 705/26; 705/44
(58) Field of Classification Search .................. 709/203, 709/217, 219, 223; 705/26, 39, 44, 50, 64, 705/75; 713/156, 175, 181, 186, 201
See application file for complete search history.

(56) References Cited

U.S. PATENT DOCUMENTS

| | | | |
|---|---|---|---|
| 5,684,951 A * | 11/1997 | Goldman et al. | 726/6 |
| 5,793,028 A * | 8/1998 | Wagener et al. | 235/380 |
| 5,826,245 A * | 10/1998 | Sandberg-Diment | 705/44 |
| 5,903,721 A * | 5/1999 | Sixtus | 726/2 |
| 2001/0027527 A1 * | 10/2001 | Khidekel et al. | 713/201 |
| 2001/0051902 A1 * | 12/2001 | Messner | 705/26 |
| 2002/0010864 A1 * | 1/2002 | Safa | 713/200 |
| 2002/0083008 A1 * | 6/2002 | Smith et al. | 705/64 |
| 2008/0275820 A1 * | 11/2008 | Joao et al. | 705/44 |

* cited by examiner

*Primary Examiner* — Lashonda T Jacobs
(74) *Attorney, Agent, or Firm* — Gifford, Krass, Sprinkle, Anderson & Citkowski, P.C.

(57) ABSTRACT

A secure transaction method involves establishing an electronically accessible verification site authorized by the holder of a credit or debit card, and accessing the verification site by a merchant to determine whether a request for goods or services is authorized. The request for goods or services is based upon the use of the credit or debit card, but the card is not physically presented. The verification site is an electronic mail account which may be established by the merchant, card holder or other authorized person or entity. An authorization message is preferably sent from the site to the merchant in response to the step of accessing the verification site by the merchant. The verification site may also be wirelessly accessible, enabling an authorization message to be delivered through a cellular telephone, personal digital assistant, or other mobile device.

15 Claims, 1 Drawing Sheet

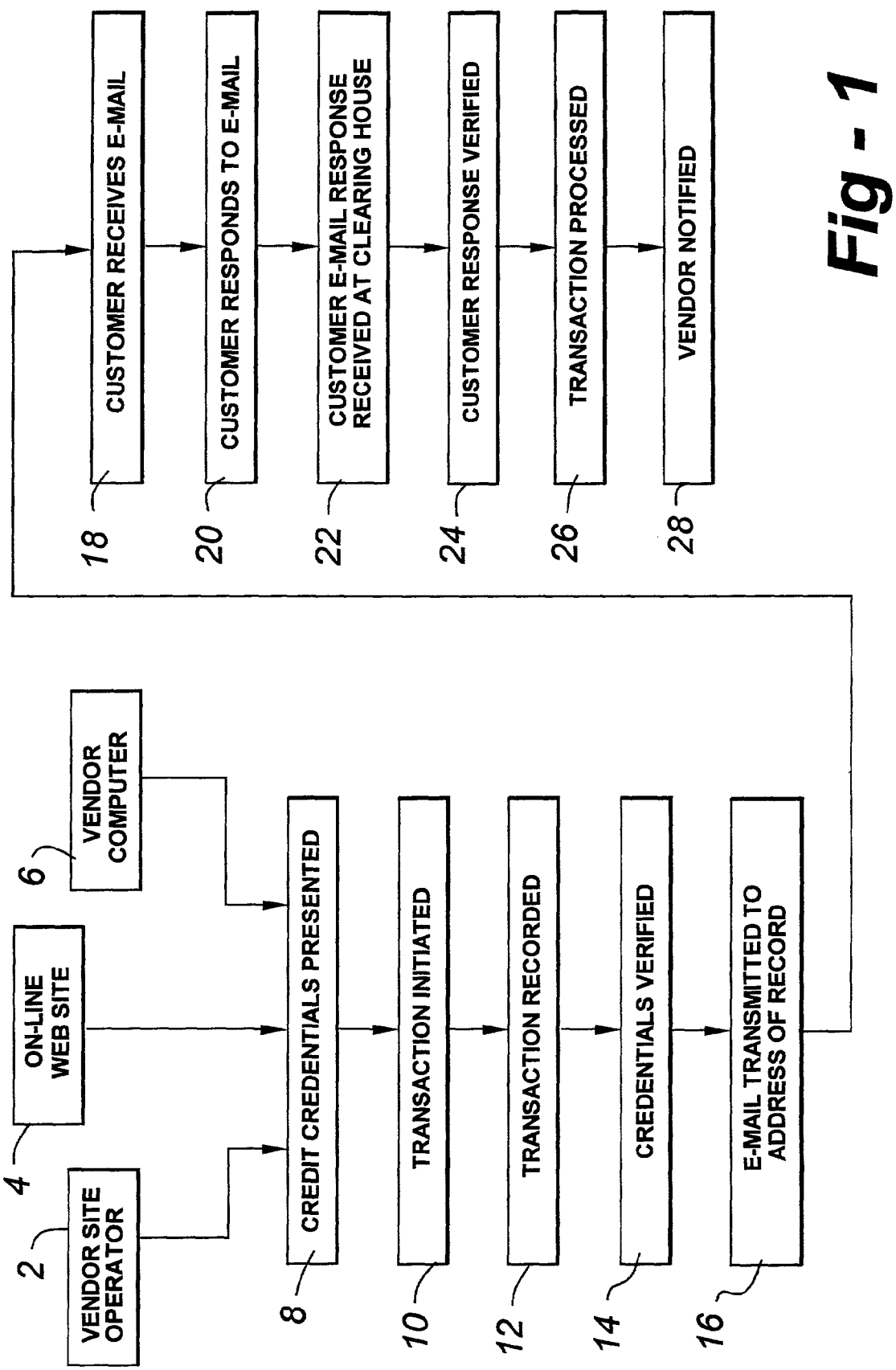

METHOD FOR SECURE TRANSACTIONS UTILIZING PHYSICALLY SEPARATED COMPUTERS

REFERENCE TO RELATED APPLICATION

This application claims priority from U.S. Provisional Patent Application Ser. No. 60/210,879, filed Jun. 9, 2000, the entire contents of which are incorporated herein by reference.

FIELD OF THE INVENTION

This invention relates to transactions conducted over computer networks, and, more particularly, to a system for securing transactions between physically separated participants from unauthorized users.

BACKGROUND OF THE INVENTION

While the near-universal availability of the Internet to users in every location has created opportunities for many new kinds of businesses, it also has opened new opportunities for fraudulent use of credit card credentials by unscrupulous criminals. In these types of transactions (referred to as "card not present" transactions), the buyer of a product provides the seller with credit card information which cannot physically be verified, because the entire transaction occurs between remote participants and/or computers. Even in cases in which a customer service clerk speaks directly to the buyer to obtain the credit card information, there is no way to verify that the credit card credentials are legitimately obtained, or that the buyer is authorized to use the credentials to effect the transaction.

Various systems have been proposed or implemented in which the buyer is expected to provide information for verification, such as the maiden name of the buyer's mother, some form of biometric information, or a scan of the physical credit card through a remote reader in the buyer's computer. In each case, these types of data may be obtained through outside sources of information, simulated, or impersonated through computer means.

SUMMARY OF THE INVENTION

This invention resides in a secure transaction method. Broadly, the method includes the steps of establishing an electronically accessible verification site authorized by the holder of a credit or debit card, and accessing the verification site by a merchant to determine whether a request for goods or services is authorized. It is presumed that the request for goods or services is received by a merchant using the credit or debit card, but wherein the card is not physically presented.

In the preferred embodiment, the verification site is an electronic mail account which may be established by the merchant, card holder or other authorized person or entity. An authorization message is preferably sent from the site to the merchant in response to the step of accessing the verification site by the merchant. The message may be automatically generated or manually generated within a predetermined period of time by the card holder or other authorized person.

The request for goods or services, the step of accessing the verification site, the authorization message, or any combination thereof, are preferably encrypted to ensure privacy. Such encryption may be implemented using an algorithm specific to the holder or an authorized user of the card to further enhance security.

The request for goods or services, the step of accessing the verification site, the authorization message, or any combination thereof, may also include routing information for future use, including subsequent verification.

The step of accessing the verification site by the merchant may cause an icon or window to appear in a web browser, should the card holder or authorized user of the card be on-line to approve of the transaction. The verification site may also be wirelessly accessible, enabling an authorization message to be delivered through a cellular telephone, personal digital assistant, or other mobile device.

BRIEF DESCRIPTION OF THE DRAWINGS

FIG. 1 shows an example of one possible implementation of the invention.

DETAILED DESCRIPTION OF THE INVENTION

In the instant invention, a method is disclosed by which verification of credentials may be accomplished using a separate, pre-established communications path. As shown in FIG. 1, whether the transaction is initiated by direct verbal contact 2, by computer communication over a wide-area communication network, such as the Internet 4, or via a direct contact from a customer computer to the vendor computer 6, the credit card credential information is provided in the usual manner, as 8, thereby initiating a transaction 10. After the credentials are recorded 12, the proposed transaction is forwarded to the credit card clearinghouse for authorization 14.

At this point, the credit card clearinghouse forwards a request for verification to an e-mail account 16 which previously has been designated by the credit card holder. This could be an account maintained for the holder by the clearinghouse itself, or it could be an independently maintained e-mail account at an "external" service provider. The request itself would carry sufficient information for the holder to identify the transaction items and the originating merchant; as a example, this would include information identifying the merchant, the items ordered, and the total amount requested to be approved. After retrieving the message, as 18, the holder then would be required to accept the transaction by acknowledging the contents of the e-mail message, as 20.

If the user already is on-line with the merchant at the time of the transaction, it is a simple matter for the holder to open a new window in his or her "Browser" and retrieve this e-mail message. Current technology, such as the new IPv6 protocol, allows the use of various types of messaging "agents" which can provide near-immediate notification of the arrival of messages; another option would be to implement a wide-area communications protocol which would give priority to the carriage of certain types of transactional information and messages. In addition, software can be incorporated into the Browser application by which certain types of pre-configured communications links could be implemented with a single click of a computer "mouse."

For verbal orders, or in the case that the credit card holder cannot retrieve the e-mail message immediately, the holder would have a pre-determined period of time in which to perform the verification of the e-mail (for example, 12 hours) after which the transaction automatically would be canceled.

As an added benefit, the existence of routing information attached to the transmitted or returned messages would allow verification of the source computer for the response message, as well as providing an "audit trail" for the entire transaction.

In an alternative embodiment, an "external" e-mail account could be programmed to automatically respond to a specific e-mail message by generating a reply message to be sent to the clearinghouse, similar to the manner in which e-mail systems automatically handle "spam" messages from identified senders. It also could respond by sending a message specific to the transaction that has been prepared in advance by the holder, in anticipation of the confirmation request from the clearinghouse.

A further enhancement would be to employ encryption to the various messages and responses, to ensure that only the credit card holder can access and respond to the messages. This encryption system could include the transmission and decoding of a specialized information file, which, among other things, could include information specific to the transaction (such as a transaction identifier or merchant number), or might require combination with additional information which would be provided by the holder. An alternative embodiment might include the application of an algorithm specific to the holder or to the transaction to modify existing data or to create new data as part of the verification method.

Once the message has been returned to the clearinghouse, as 22, the message can be analyzed and verified for authenticity, as 24, including any verification as to the response time relative to the established, allowed time frame. If everything is in order, then the transaction is processed, as 26, and the vendor is notified of the approval, as 28. As an option, a separate notification may be transmitted to the customer, confirming that the order has been approved and processed. Optionally, a response to this customer e-mail could be required, as a further confirmation that the entire process has been completed properly.

We claim:

1. A secure transaction method, comprising the steps of:
    establishing an electronically accessible verification site authorized by the holder of a credit card;
    receiving a request for goods or services by a merchant using the credit card, but wherein the card is not required to be physically presented to the merchant;
    accessing the verification site by the merchant to determine whether the request for goods or services is an authorized transaction;
    sending an electronic authorization communication by the verification site to the holder of the credit card, the message including information indicative of the transaction; and
    transmitting, by the holder of the credit card, an approval communication if the transaction is approved by the card holder.

2. The method of claim 1, wherein the verification site is an electronic mail account.

3. The method of claim 2, wherein the electronic mail account was established by the merchant.

4. The method of claim. 1, wherein an authorization message is sent from the site to the merchant in response to the step of accessing the verification site by the merchant.

5. The method of claim 4, wherein the authorization message is automatically generated.

6. The method of claim 4, wherein the authorization message is manually generated within a predetermined period of time.

7. The method of claim 4, wherein request for goods or services, the step of accessing the verification site, the authorization message, or any combination thereof, are encrypted.

8. The method of claim 7, wherein the encryption is implemented using an algorithm specific to the holder or an authorized user of the card.

9. The method of claim 4, wherein request for goods or services, the step of accessing the verification site, the authorization message, or any combination thereof, include routing information for future use.

10. The method of claim 1, wherein the step of accessing the verification site by the merchant causes an icon or window to appear in a web browser.

11. The method of claim 1, wherein the verification site is wirelessly accessible.

12. The method of claim 11, wherein the site is accessible through a cellular telephone, personal digital assistant, or other mobile device.

13. The method of claim 1, wherein the information indicative of the transaction includes information identifying the merchant.

14. The method of claim 1, wherein the information indicative of the transaction includes information identifying the goods or services.

15. The method of claim 1, wherein the information indicative of the transaction includes the cost of the transaction.

* * * * *